July 7, 1959 E. T. ABLE 2,893,240
SAFETY BELT AND HARNESS TESTERS
Filed Nov. 7, 1957 3 Sheets-Sheet 1
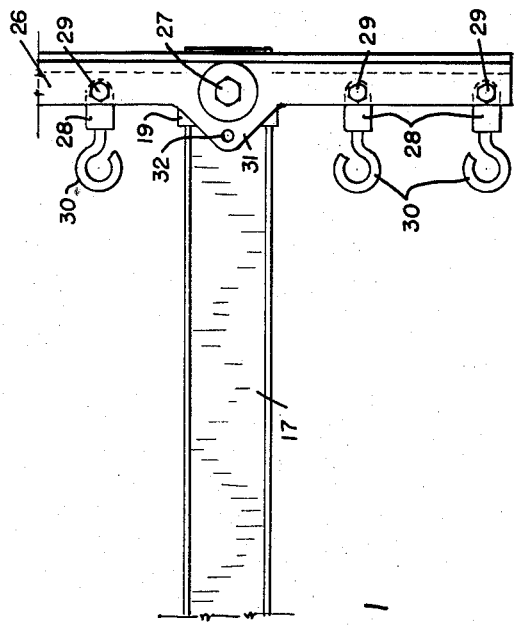
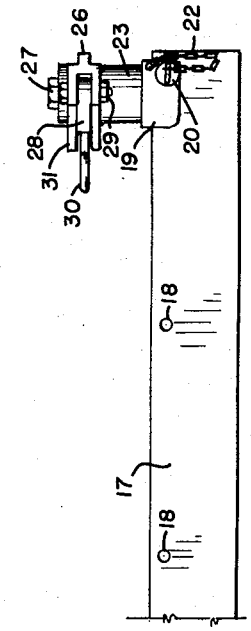
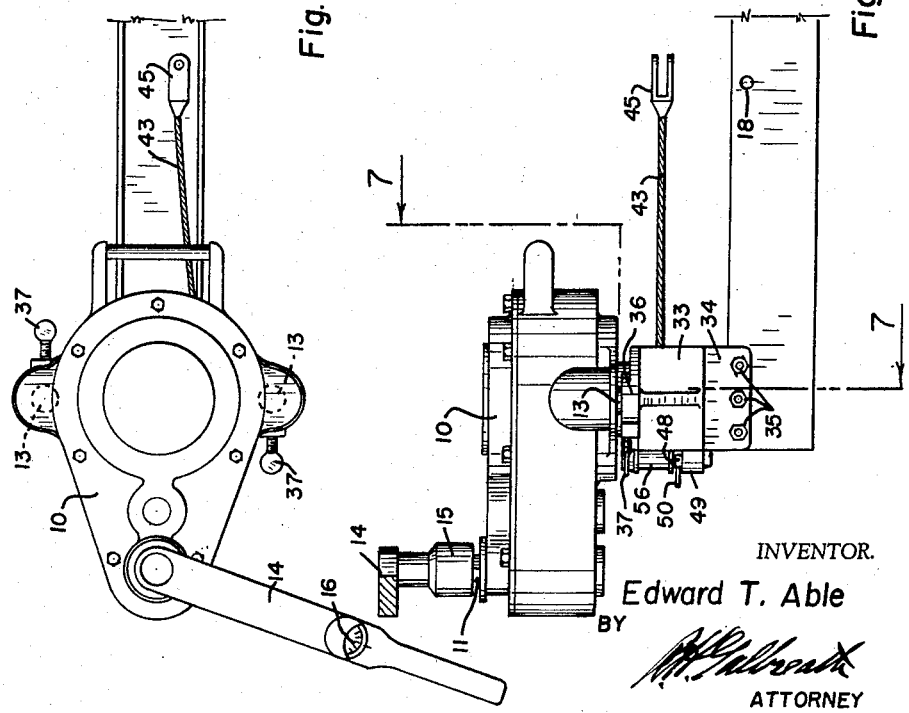
INVENTOR.
Edward T. Able
BY
ATTORNEY July 7, 1959  E. T. ABLE  2,893,240
SAFETY BELT AND HARNESS TESTERS
Filed Nov. 7, 1957  3 Sheets-Sheet 2

INVENTOR.
Edward T. Able
BY
ATTORNEY

July 7, 1959

E. T. ABLE 2,893,240

SAFETY BELT AND HARNESS TESTERS

Filed Nov. 7, 1957

INVENTOR.
Edward T. Able
BY

ATTORNEY

United States Patent Office 2,893,240
Patented July 7, 1959

2,893,240

SAFETY BELT AND HARNESS TESTERS

Edward T. Able, Denver, Colo., assignor to B. K. Sweeney Manufacturing Co., Denver, Colo.

Application November 7, 1957, Serial No. 695,011

4 Claims. (Cl. 73—95)

This invention relates to a safety belt and harness tester and has for its principal object the provision of a device of this character which can be effeciently employed for applying a predetermined tension to the elements of safety belts and hardnesses, such as used by the Armed Forces on aircraft and automotive equipment; which will be readily adjustable to accommodate belts and harnesses of differing types and sizes; which will incorporate a torque multiplier so that a relatively great tension can be applied to the element being tested with a minimum of manual effort on the part of the operator; and which will incorporate an accurate indicator which will serve as a tensiometer to accurately indicate the tension which is being applied to the element being tested.

Another object is to provide a device of this character which will adapt a conventional gear wrench and a conventional torque-indicating wrench for tension testing purposes.

A further object of the invention is to provide a tension testing device which will be readily portable and light in weight; which can be mounted either horizontally on a bench or vertically on a wall; and from which the gear wrench and torque wrench elements may be readily removed for other uses.

While more particularly adaptable for testing safety belts and harnesses, the device also will find valuable use in testing anything which will be subjected to tension, such as cables, ropes, cords, cable fittings, etc.

Other objects and advantages reside in the detail construction of the invention, which is designed for simplicity, economy, and efficiency. These will become more apparent from the following description.

While a specific form of the improvement has been described and illustrated herein, it is to be understood that the same may be varied within the scope of the appended claims, without departing from the spirit of the invention.

In the drawing:

Fig. 1 is a plan view, partially broken away, of the improved tension tester;

Fig. 2 is a side view thereof;

Figure 3:
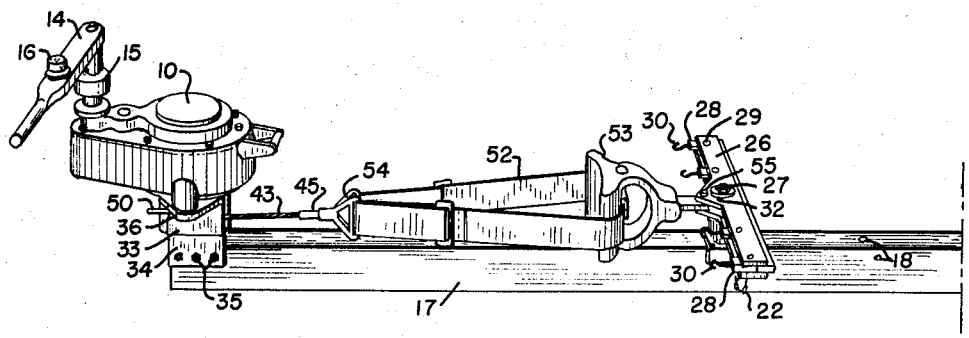
Fig. 3 is a perspective view illustrating the appearance of the improved tester when testing a conventional safety belt.

The improved tester is designed to make use of a gear operated wrench of the type illustrated in prior Patent No. 2,712,255 and a torque indicating wrench of any conventional type, such as the one illustrated in prior Patent No. 2,651,935 and a ratchet adapter as illustrated and described in prior Patent No. 2,773,574. The gear-operated wrench, which will be herein designated in its entirety by the numeral 10, comprises a plurality of reduction gears contained within a suitable gear housing from adjacent one end of which an input shaft 11 extends upwardly and from adjacent the other end of which an output shaft 12 extends downwardly. The housing of the wrench 10 is provided with two downwardly-extending bracket studs 13 by means of which it may be mounted upon any desired support. The torque indicating wrench is illustrated at 14 and is provided with a suitable ratchet-adapter socket 15 which is fully described in applicant's prior Patent No. 2,773,574. For this use, the ratchet-adapter socket 15 is fitted over the input shaft 11 of the gear-operated wrench 10. The torque wrench is provided with a torque indicating dial 16 of any of the conventional forms for indicating the pounds torque being delivered by the wrench.

The improved tester employs a base beam 17, preferably of the conventional H-cross-section, positioned with its web horizontal and its flanges vertical and provided with longitudinally-spaced pin holes 18 in its upper flanges. An inverted U-shaped yoke 19 is fitted over the two upper flanges of the base beam 17. The yoke 19 is longitudinally adjustable along the base beam and can be secured in any desired longitudinal position thereon by passing a suitable locking pin 20 through the yoke and through the selected pin holes 18. The locking pin is preferably provided with a spring-urged ball click 21 which acts to latch it in place and with a suitable tie chain 22 which prevents loss of the pin. An anchor post 23 is formed on and arises from the middle of the yoke 19 and a pivot boss 24 projects upwardly from a shoulder 25 on the anchor post 23.

An elongated belt spreader bar 26 is pivotally mounted on the pivot boss 24 of the anchor post so as to rest upon the shoulder 25 therein. The spreader bar 26 is held in place by means of a suitable retaining washer and cap screw 27 threaded into the anchor post, and extends equally oppositely-outward from the anchor post. The spreader bar 26 is formed with an open channel extending throughout its length and opening toward the forward side thereof.

A plurality of hook swivel blocks 28 are mounted in the channel of the spreader bar 26 in spaced-apart relation upon suitable pivot bolts 29. A hook 30 is threaded into each of the swivel blocks 28 and extends forwardly therefrom. Two vertically spaced ears 31 extend forwardly from the middle of the spreader bar 26 and are provided with vertically aligned bolt holes 32. The spreader bar is free to pivot in a horizontal plane about the axis of the anchor post 23 and the swivel blocks 28 are free to pivot about the axes of the pivot bolts 29.

A hollow anchor housing 33 is mounted on the forward extremity of the base beam 17 and projects upwardly therefrom. The anchor housing 33 is provided with two downwardly extending flanges 34 which are bolted to the upwardly extending flanges of the base beam 17 by means of suitable attachment bolts 35. The anchor housing is provided with two oppositely extending bracket ears 36, each of which is provided with a vertical guide opening for receiving one of the bracket studs 13 of the geared power wrench 10 and with a set screw 37 by means of which the studs are locked in place in the ears 36. When in place, the output shaft 12 of the gear wrench 10 extends downwardly through aligned bearings 38 in the anchor housing 33 and through a cable drum 39 and a ratchet wheel 40. The cabe drum 39 is keyed to the shaft 12 by means of a suitable key 41 and the ratchet wheel 40 is keyed to the cable drum 39 by means of suitable key pins 42.

The cable drum 39 is spirally grooved to receive a tension cable 43, one extremity of which is locked to the drum in any suitable manner such as by means of an inset terminal cable clip 44. The free extremity of the cable 39 terminates in a forked cable terminal 45.

It can be seen that if the torque wrench 14 be swung in an arc, power will be transmitted through the gear wrench 10, at reduced speed and increased torque, to the cable drum so as to rotate the latter in a direction to reel in the tension cable 43.

A ratchet pawl 46 is constantly urged against the teeth of the ratchet wheel 40 by means of a pawl spring 47. The pawl 46 projects from a vertical pawl shaft 48 which projects upwardly from a pawl pocket 49 formed in the anchor housing 33. A pawl release handle 50 projects from the pawl 48, by means of which the pawl may be manually swung from engagement with the teeth of the pawl wheel when desired.

Figure 4:
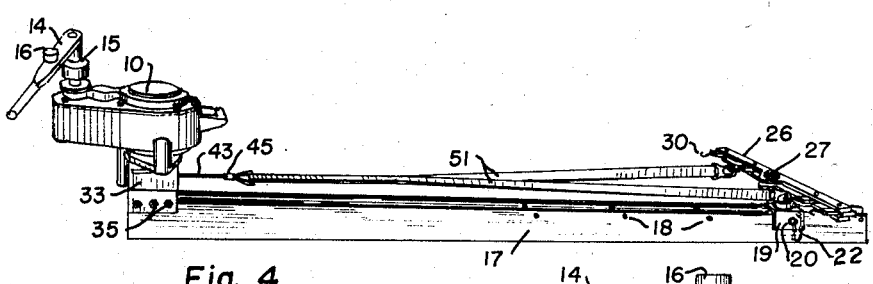
Fig. 4 is a similar perspective view illustrating the device in use testing a conventional aircraft harness.
Figure 5:
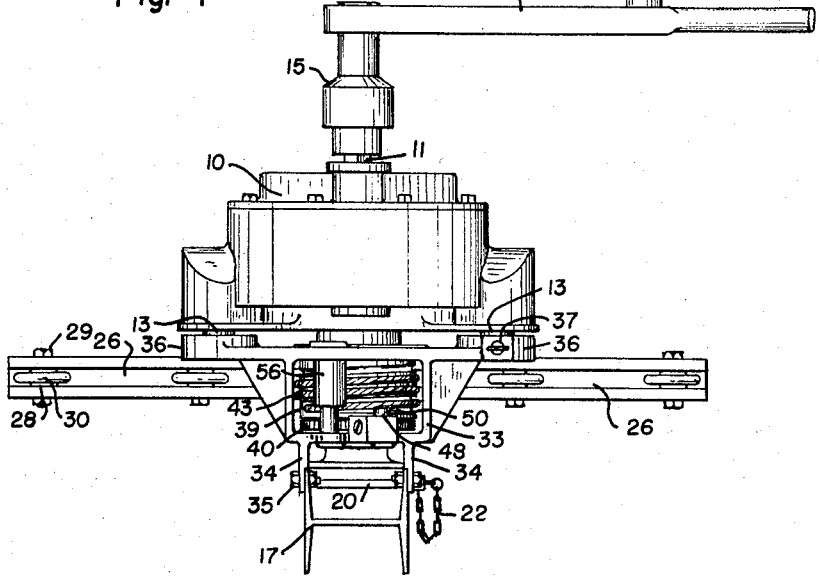
Fig. 5 is an enlarged front end view of the tester.
Figure 6:
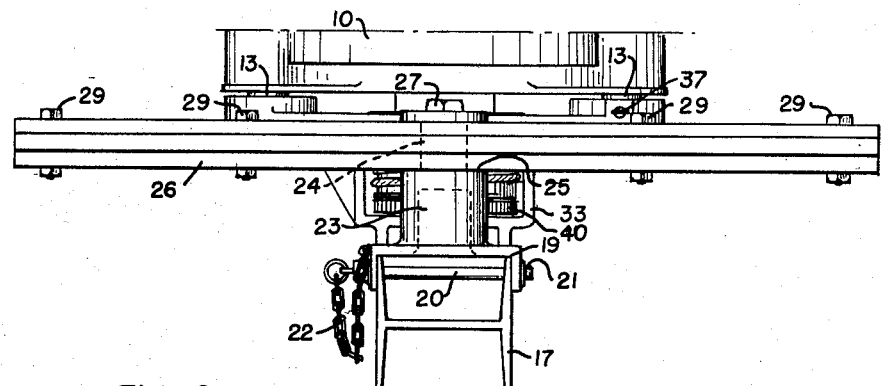
Fig. 6 is a similar rear end view thereof.
Figure 7:
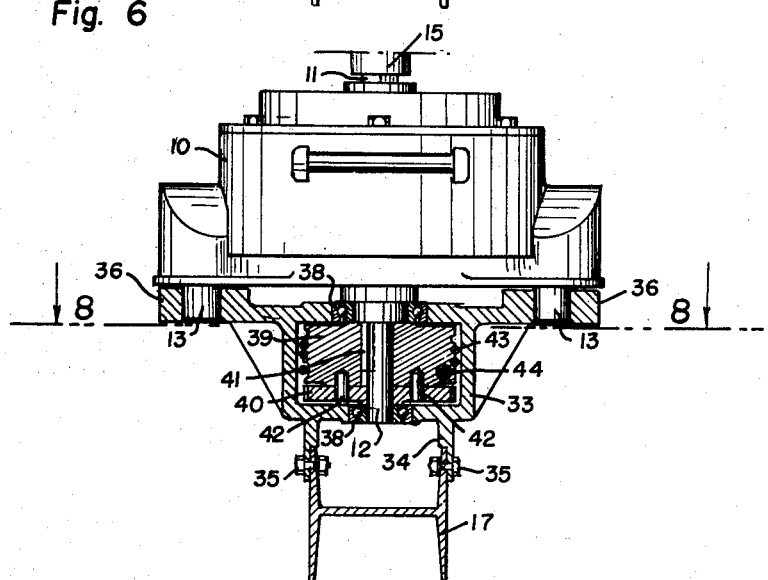
Fig. 7 is an enlarged cross-section, taken on the line 7—7, Fig. 2.
Figure 8:
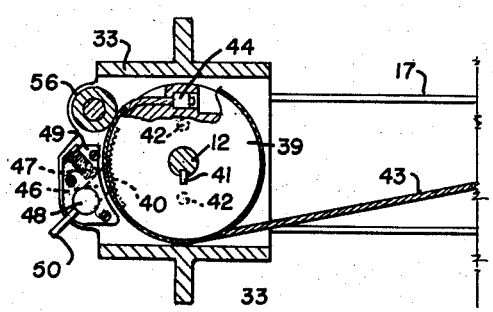
Fig. 8 is a fragmentary horizontal section, taken on the line 8—8, Fig. 7.

If a Y-type aircraft harness, such as indicated at 51, is to be tested, the stem strap of the harness is connected, in any suitable manner, to the forked cable terminal 45 and the two Y-straps are connected to two of the hooks 30 so as to be equally spaced on each side of the anchor post 23, as shown in Fig. 4. The torque wrench 14 is then actuated to rotate the cable drum 39 until the torque index dial 16 indicates that the desired tension has been applied to the harness. Since the spreader bar 26 is free to pivot, the tension will be divided equally between the two Y-straps.

Single straps can be connected between the cable terminal 45 and a pin or bolt passing through the bolt holes 32 in the ears 31 at the middle of the spreader bar. For relatively long single wide belts, such as shown at 52, in Fig. 3, a saddle fitting 53 is provided having an arcuate seat, over which, the belt 52 is passed. The belt terminals, indicated at 54, are connected to the cable terminal 45. The saddle fitting 53 is mounted between the ears 31 upon a suitable bolt or pin 55. The same tensioning procedure is followed and, since the belt can slide over the surface of the arcuate seat in the saddle fitting, the tension in the belt will be uniform throughout its length. With the saddle fitting belts and straps of greater length than the base beam 17 can be tested since they can be doubled back upon themselves.

In actual practice the gears in the gear wrench 10 produce a 5 to 1 ratio. Therefore, when the torque dial 16 indicates 200 lbs., a tension of 1000 lbs. is being applied to the element being tested.

While the device has been described as positioned in a horizontal plane on a floor or bench, it can be mounted in any desired position, such as in a vertical plane and parallel to, or perpendicular with, the floor. The torque wrench 14 and/or the ratchet adapter 15 can be lifted from the tester for other shop uses. The gear wrench can also be removed by simply loosening the set screws 37 for use on a propeller blade wrench such as described in applicant's prior Patent No. 2,712,255, and for any other desired uses.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. A tension testing device comprising: an elongated base beam; an anchor member fixedly mounted on said base beam adjacent its one extremity; a drum shaft rotatably mounted on said base beam adjacent its other extremity; a winding drum fixedly mounted on said drum shaft; a flexible element; on extremity of said flexible element being fixedly secured to said drum so that said element will coil about said drum when the latter is rotated; means for securing an element to be tested between the other extremity of said flexible element and said anchor member; a torque-indicating wrench having a torque dial mounted thereon to indicate the pounds torque being applied by said wrench; and torque-multiplying gears transmitting torque from said torque wrench to said drum shaft.

2. A tension testing device comprising: an elongated base beam; an anchor member fixedly mounted on said base beam adjacent of one extremity of the latter; a drum shaft rotatably mounted on said base beam adjacent its other extremity; a winding drum fixedly mounted on said drum shaft; a flexible element secured to said drum at its one extremity and adapted to wind thereabout; a spreader bar pivotally mounted adjacent its middle upon said anchor member so as to be rotatable in a plane parallel to the plane of said base beam; hooks carried by said spreader bar on opposite sides of its pivot point for attachment to a specimen to be tested; and means on the other extremity of said flexible element for attachment to said specimen; means for applying torque to said drum shaft to apply tension to said specimen; and means indicating the amount of torque being applied to said drum shaft.

3. A tension testing device as described in claim 2 having an inverted U-shaped yoke formed on said anchor member and resting over said base bar; and a removable locking pin extending through said yoke and through openings in said base bar to prevent longitudinal movement of said anchor member, said base bar being provided with a plurality of spaced pin-receiving openings to allow the longitudinal position of said anchor member to be varied.

4. A tension testing device as described in claim 3 having means for pivotally mounting said hooks on said spreader bar so that they may swing in the plane of the latter.

References Cited in the file of this patent

UNITED STATES PATENTS

| | | |
|---|---|---|
| 2,030,464 | Nilson | Feb. 11, 1936 |
| 2,400,920 | Cummings | May 28, 1946 |
| 2,569,509 | Wells | Oct. 2, 1951 |

FOREIGN PATENTS

| | | |
|---|---|---|
| 4,158 | Switzerland | Nov. 22, 1891 |